United States Patent Office 2,694,004
Patented Nov. 9, 1954

2,694,004

POLISHING MATERIAL

William W. Coffeen, Union, N. J., assignor to Metal & Thermit Corporation, New York, N. Y., a corporation of New Jersey No Drawing. Application July 20, 1951, Serial No. 237,829

2 Claims. (Cl. 51—308)

This invention relates to polishing material especially adapted to the polishing of glass, particularly the polishing of ophthalmic glass, and more especially to the particle size classification of the polishing material.

It is a primary object of the invention to provide an improved polishing powder for glass, having a large proportion of its particles in the most desirable polishing size range, and having proportions of particles of undesirably small size limited more sharply than heretofore.

It is a more particular object to provide a polishing powder of the kind referred to above which consists substantially of zirconium silicate.

The most commonly used material for the polishing of glass is iron oxide or rouge. While this material is a fairly efficient polishing compound and is reasonable in cost, its color is objectionable because of the difficulty of cleaning the finished glass and because of discoloration of the skin of the workmen. Agitation has, therefore, arisen in the industry to replace the red rouge with a less objectionable white material of equal or better polishing ability. Where white material has been substituted the improved ease of cleaning of the finished glass and the improvement in morale of the workers in the polishing departments has more than offset the increased cost of the white polishing compounds. Silica has been suggested as a glass polishing material but the health hazards involved in the industrial application of fine silica powders has discouraged its adoption. Ceria has been used to some extent but this material is very expensive and supplies are inadequate. Zirconia has found most favor, but this material is also fairly expensive and is troublesome to maintain in suspension satisfactorily. Accordingly, a white, low cost polishing material which is available in quantity is highly desired by the glass polishing trade.

Zirconium silicate as derived from the natural mineral xircon has been proposed hand has met with some success. The natural mineral zircon has a hardness on the Moh's scale of 7.5, and since glasses normally have hardness in the range of 4.5 to 6.5, it is evident that zircon could be used to abrade glass. The literature testifies amply to this fact. Recently, Maloney (U. S. Patent No. 2,427,799) has developed a zircon for the polishing of glass in which he has specified that at least ninety percent of material shall be of a fineness of two microns or less in diameter.

My investigations have shown that while the finely-divided zircon materials specified by Maloney have some merit, much improved and more efficient polishing materials can be made if the extremely fine particles used by Maloney are avoided. In fact, my studies have indicated that the optimum particle size for a zircon-base polishing material for glass is in the range of 3 microns instead of the less than 2 micron range used by Maloney. Finer materials are less efficient in polishing and also tend to permit the polishing surface to approach too closely to the glass surface, thus allowing the formation of "smears."

It is well known in the trade that very large particles cause scratching. My work has shown, however, that small amounts of particles up to 10 microns are not harmful. The most desirable polishing material would have essentially all its particles in the range of 3 microns. The production of such a material, while commercially possible, would result, however, in an unduly high cost of production. As a result, I believe the overall economy is best when a polishing material is produced having the major part of its particles in a size range from 1 to 5 microns, with most of these in the range of 3 microns. My reasons for this will become clear in the following discussion.

My improved zirconium silicate polishing materials are all made from natural zircon sand as a starting material. I prefer to use a fairly pure sand from which practically all the ilmenite and rutile normally associated with zircon sands have been removed. This sand may then be comminuted in any one of a number of ways, my preference being for wet grinding in a ball mill. The zircon may be ground to any state of subdivision which contains appreciable particles of a size below 5 microns and, if a continuous, closed-circuit process of grinding and classification is used, the amount of under 5 micron material removed at each pass may be small. However, for batch operation, I prefer to grind the zircon until at least 80% is below 5 microns. This ground material is then diluted with water to about 20% solids content, and classified.

The classification may be carried out in a number of ways, e. g., by settling in tanks with or without electrolytes or by centrifugal classification, either batch or continuous. I prefer to use continuous centrifugal classification. Any of these classification procedures will, of course, only separate material into one fine fraction and one coarse fraction for each cycle. This means that to produce material of an intermediate size, at least two separations must be made, e. g., one in which the coarse fraction is separated from the intermediate and fine, followed by a second pass through the system to separate the fine from the intermediate. Since no commercial separation can be perfectly clean, the overlapping portions thus become a source of waste of valuable material. Such a process adds greatly to the expense. I prefer, therefore, to adjust my grinding and classifying procedures to produce a material which can be separated out with a single pass through the system even though the resulting product contains some worthless fractions, in particular that below 1 micron, and an additional amount of only fair polishing material in the 1 to 2 micron classification, together with some particles in excess of 4 microns which again are of lower polishing value, but having a larger proportion of material in the range 1–4 microns with the major part of this in the optimum range of 3 microns.

A sample designated A was prepared as an example of polishing material according to my invention. A sample designated B was prepared as an example of the polishing material of Maloney. A sample designated C was prepared having a percentage of relatively large particles too great to fall within the scope of the invention. The comparative particle size distributions in the various pertinent ranges were as follows:

|  | A | B | C |
|---|---|---|---|
| Below 1 micron | 38% by weight | 88% by weight | 19%. |
| 1 to 2 microns | 29% by weight | 8.5% by weight | 18%. |
| 2 to 4 microns | 24% by weight | 3.5% by weight | 25%. |
| 4 to 10 microns | 9% by weight | 0.5% by weight | 38%. |
| Polishing ability | Very good | Fair, tends to produce smears. | Fair, tends to produce checks or scratches. |

The evaluation of a polishing material is difficult at best and the opinions of skilled technicians in the trade remain the best criteria. These were counted heavily in the establishment of the ratings given above. The amount of glass removed has been used by some investigators as indicative of the efficiency of polishing, but it is obvious that high rates of glass removal are not necessarily productive of rapid polishing or of especially desirable finished surfaces. The rate of production of a "cleared" surface can also be considered as a rating method for a polishing compound, but this is dependent very largely upon the accuracy of the grinding of the surface of the blank before it comes to the polishing head. The above ratings took all these factors into consideration and were based on the behavior of the polishing compounds in parallel operation on spectacle crown blanks in a commercial polishing plant.

By a plural pass classifying procedure a material (sample D) can be obtained having no particles above 10 microns in average diameter, at least 70% by weight of the particles lying in the 1 to 4 micron range, with at least 40% in the 2 to 3 micron range, there being not more than 30% in the range below 1 micron and not more than 10% in the 4 to 10 micron range. This material is somewhat superior to sample A and is a desirable material for special uses. For most purposes, however, the improved results do not justify the increased cost of production.

A still further improved material (sample E) can be obtained by further refinement of procedure, having at least 80% by weight of its particles in the 2 to 4 micron range, and no particles above 10 microns. Here again the improvement over sample A does not justify the added cost except in very special cases.

I have described what I believe to be the best embodiments of my invention. I do not wish, however, to be confined to the embodiments described, but what I desire to cover by Letters Patent is set forth in the appended claims.

I claim:

1. A polishing material consisting of zirconium silicate in a state of subdivision such that at least 40% by weight of the particles lie within the range of 1 to 4 microns in average diameter, not more than 40% being below 1 micron in average diameter, not more than 70% being below 2 microns, not more than 30% being in the range of 4 to 10 microns, and none being above 10 microns.

2. A polishing material consisting of zirconium silicate in a state of subdivision such that at least 70% by weight of the particles lies within the range of 1 to 4 microns in average diameter with at least 40% in the 2 to 3 micron range, not more than 20% being below 1 micron, not more than 40% being below 2 microns, not more than 30% being in the range of 4 to 10 microns, and none being above 10 microns.

References Cited in the file of this patent

UNITED STATES PATENTS

| Number | Name | Date |
|---|---|---|
| 2,399,237 | Maloney | Apr. 30, 1946 |
| 2,427,799 | Maloney | Sept. 23, 1947 |
| 2,489,307 | Miller | Nov. 29, 1949 |
| 2,554,070 | Stead | May 22, 1951 |